US007016487B1

(12) United States Patent
Kwon

(10) Patent No.: US 7,016,487 B1
(45) Date of Patent: Mar. 21, 2006

(54) DIGITAL ECHO CANCELLATION DEVICE

(75) Inventor: Oh-sang Kwon, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 250 days.

(21) Appl. No.: 09/648,806

(22) Filed: Aug. 28, 2000

(30) Foreign Application Priority Data

Aug. 27, 1999 (KR) ............................... 1999-35838

(51) Int. Cl.
*H04M 9/08* (2006.01)

(52) U.S. Cl. ........................... 379/406.01; 379/406.08; 379/406.11; 370/290

(58) Field of Classification Search ........... 379/406.01, 379/406.08, 406.09, 406.02, 406.11; 370/286, 370/289, 290, 291
See application file for complete search history.

(56) References Cited

U.S. PATENT DOCUMENTS 5,251,186 A * 10/1993 Lockwood .................. 367/103
5,532,700 A * 7/1996 Lockwood .................. 342/378
6,142,942 A * 11/2000 Clark ......................... 600/443
6,377,637 B1 * 4/2002 Berdugo ..................... 375/346

FOREIGN PATENT DOCUMENTS

EP 0 519 498 A2 12/1992

* cited by examiner

*Primary Examiner*—Binh K. Tieu
(74) *Attorney, Agent, or Firm*—Sughrue Mion, PLLC

(57) ABSTRACT

A digital echo cancellation device is provided. The digital echo cancellation device used for a high speed bidirectional communication system includes an adaptive beamformer in the form of a plurality of finite impulse response (FIR) filters for estimating an input receiving signal, the adaptive beamformer for estimating a front part, which rapidly changes in an echo path impulse response, by adaptively estimating the input receiving signal and an orthogonalized infinite impulse response (IIR) filter for receiving the estimated signal output from the adaptive beamformer and estimating a hind part of the echo path impulse response on the basis of an IIR. According to the digital echo cancellation device, the amount of calculation and the amount of required memory is significantly reduced, convergence speed is high, and the stability of the output of the filter is improved since the impulse response of the echo path is estimated by only several tens of taps.

5 Claims, 3 Drawing Sheets

DIGITAL ECHO CANCELLATION DEVICE

BACKGROUND OF THE INVENTION

1. Field of the Invention

The present invention relates to a digital echo cancellation device, and more particularly, to a digital echo cancellation device having improved convergence with a small amount of calculation and a small amount of memory.

2. Description of the Related Art

In the field of high speed communication applications such as asymmetric digital subscriber's line (ADSL), echo is common communications problem. Therefore, research has been conducted regarding apparatuses and technologies for removing echo.

A conventional echo cancellation device is disclosed in U.S. Pat. No. 4,268,727, entitled "Adaptive Digital Echo Cancellation Circuit," registered on May 19, 1981, and issued to Agrawal et al. FIG. 1 is a block diagram showing the structure of the digital echo cancellation device disclosed in U.S. Pat. No. 4,268,727. Referring to FIG. 1, the conventional digital echo cancellation device includes a finite impulse response (FIR) filter and a correlator 32 for compensating for the coefficient of an adaptive filter using a correlation between a receive signal 102 and a send signal 104.

However, in the conventional digital echo cancellation device, many taps are required since the conventional digital echo cancellation device is constituted of an adaptive FIR filter and it takes a long time to obtain the optimal resolution since a least mean square (LMS) algorithm is used for compensating for the filter coefficient. In particular, when signals, in which a high correlation exists between each other, such as aural signals are input, convergence deteriorates and time spent on canceling echo increases.

Another conventional technology for solving the above problem is disclosed in U.S. Pat. No. 5,084,865, entitled "Echo Canceler Having FIR and IIR Filter for Canceling Long Tail Echos," registered on Jan. 28, 1992, and issued to Koike. FIG. 2 is a block diagram showing the structure of a digital echo cancellation device, disclosed in U.S. Pat. No. 5,084,865. Referring to FIG. 2, another conventional digital echo cancellation device includes an FIR filter 6 and a tail canceler 7, which are connected to a hybrid 1. The tail canceler 7 includes an infinite impulse response (IIR) filter 24. After delay signals pass through the tapped delay line of the FIR filter 6, they are repeatedly multiplied with each other by the multiplier 14 of the IIR filter 24, and a correlator 22 compensates for the filter coefficient.

In the above digital echo cancellation device, the amount of calculation is reduced by using two-stage FIR and IIR filters, however, the stability of the output of the post-stage IIR filter deteriorates.

SUMMARY OF THE INVENTION

To solve the above problems, it is an object of the present invention to provide an echo cancellation device capable of reducing the amount of calculation and the amount of memory and improving the stability of the output of a filter.

Accordingly, to achieve the above object, according to an aspect of the present invention, there is provided a digital echo cancellation device used for a high speed bidirectional communication system, comprising an adaptive beamformer in the form an finite impulse response (FIR) filter for estimating an input receiving signal, the adaptive beamformer for estimating a front part, which rapidly changes in an echo path impulse response, by adaptively estimating the input receiving signal and an orthogonalized infinite impulse response (IIR) filter for receiving the estimated signal output from the adaptive beamformer and estimating a hind part of the echo path impulse response on the basis of an IIR.

The digital echo cancellation device preferably further comprises a first adder for subtracting a signal output from the adaptive beamformer from a receiving signal and outputting a first error signal and a second adder for receiving the first error signal, subtracting the signal output from the orthogonalized IIR filter from the first error signal, and outputting a second error signal.

According to another aspect of the present invention, there is provided a digital echo cancellation device used for a high speed bidirectional communication system, comprising an adaptive beamformer in the form of a finite impulse response filter for estimating an input receiving signal, for estimating a front part which rapidly changes in an echo path impulse response by adaptively estimating the input receiving signal, an orthogonalized infinite impulse response (IIR) filter for receiving an estimated signal, which is output from the adaptive beamformer, and estimating a hind part of the echo path impulse response on the basis of an IIR, a first adder for subtracting a signal output from the adaptive beamformer from a receiving signal and outputting a first error signal, and a second adder for outputting a second error signal as a signal from which echo is canceled by subtracting the signal output from the IIR filter from the signal output from the first adder.

BRIEF DESCRIPTION OF THE DRAWING(S)

The above object and advantages of the present invention will become more apparent by describing in detail a preferred embodiment thereof with reference to the attached drawings in which.

DESCRIPTION OF THE PREFERRED EMBODIMENT(S)

Figure 1:
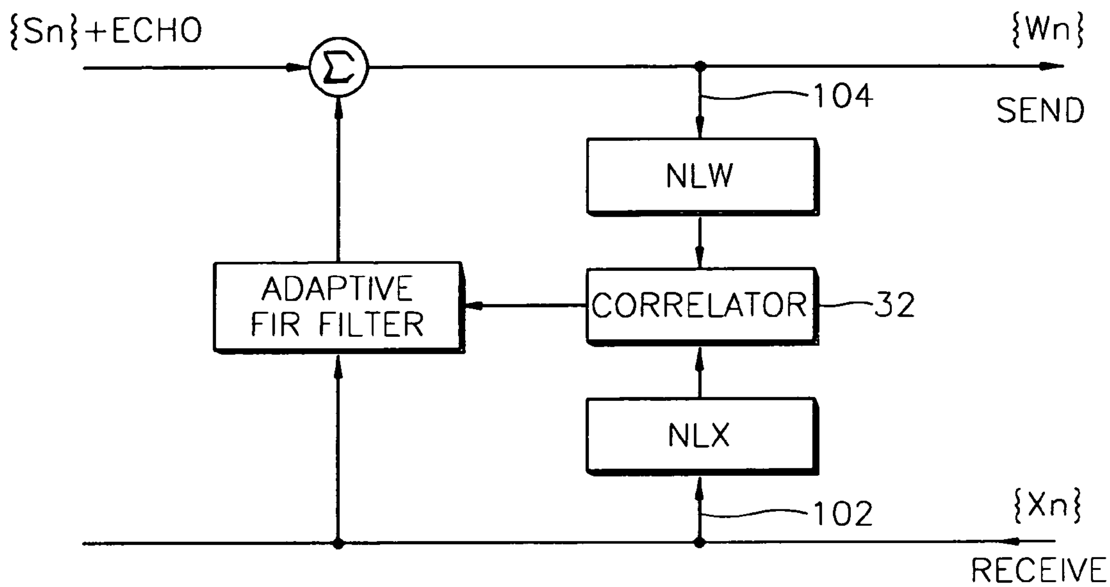
FIG. 1 is a block diagram illustrating the structure of a conventional digital echo cancellation device.
Figure 3:
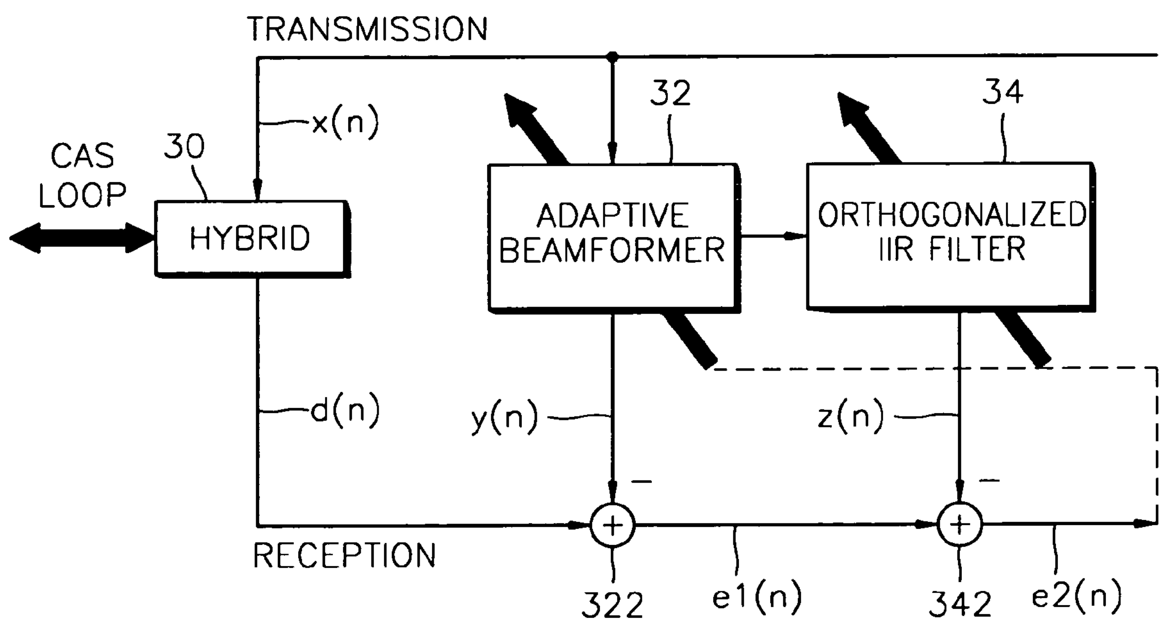
FIG. 3 is a block diagram schematically illustrating the structure of a digital echo cancellation device according to an embodiment of the present invention.
Figure 2:
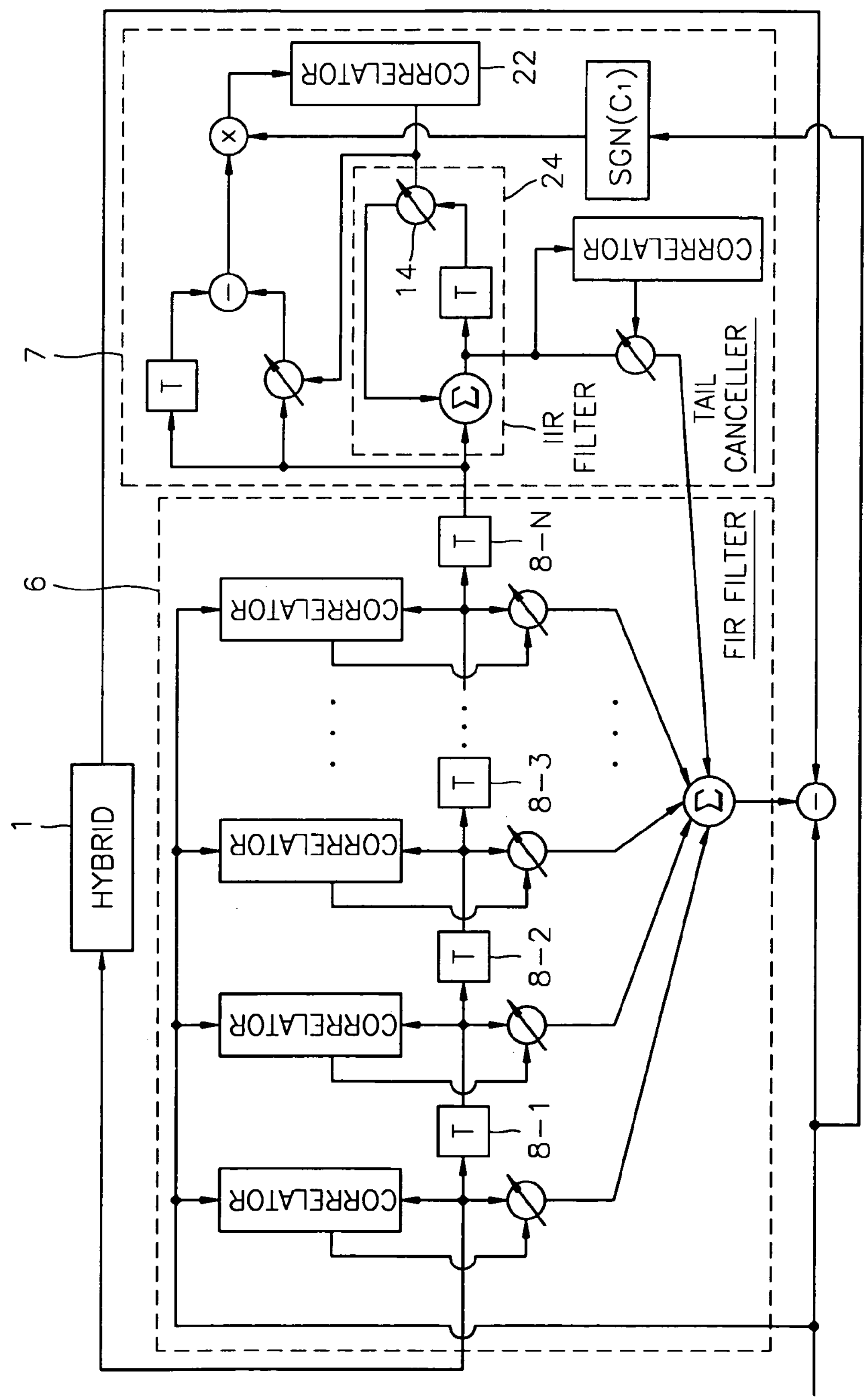
FIG. 2 is a block diagram illustrating the structure of another conventional digital echo cancellation device.

FIG. 3 is a block diagram schematically showing the structure of a digital echo cancellation device according to an embodiment of the present invention. Referring to FIG. 3, the digital echo cancellation device according to the present invention includes a hybrid 30, an adaptive beam former 32, an orthogonalized infinite impulse response filter (IIR) 34, a first adder 322, and a second adder 342.

The operation of the digital echo cancellation device will now be described. The adaptive beamformer 32 adaptively estimates an input receiving signal x(n). The orthogonalized IIR filter 34 receives the estimated signal output from the adaptive beamformer 32, generates an orthogonalized signal with respect to the estimated signal, and estimates the impulse response of an echo path.

In this device, it is possible to rapidly obtain the optimal resolution and to improve the stability of the output of the orthogonalized IIR filter 34 since the well-estimated signal output from the adaptive beamformer 32 is used as an input signal by the orthogonalized IIR filter 34. Further, it is possible to estimate a resolution using a small number of taps since the characteristics of the IIR filter are used by the orthogonalized IIR filter 34.

The adder 322 subtracts a lattice-type filter output signal y(n) generated by the adaptive beamformer 32 from a received transmission signal d(n) and outputs a first error signal e1(*n*). The first error signal e1(*n*) is input to the adder 342 and an output signal z(n) of the orthogonalized IIR filter 34 is subtracted from the first error signal e1(*n*) to generate a second error signal e2(*n*). The second error signal e2(*n*) is an echo-canceled signal.

Figure 4:
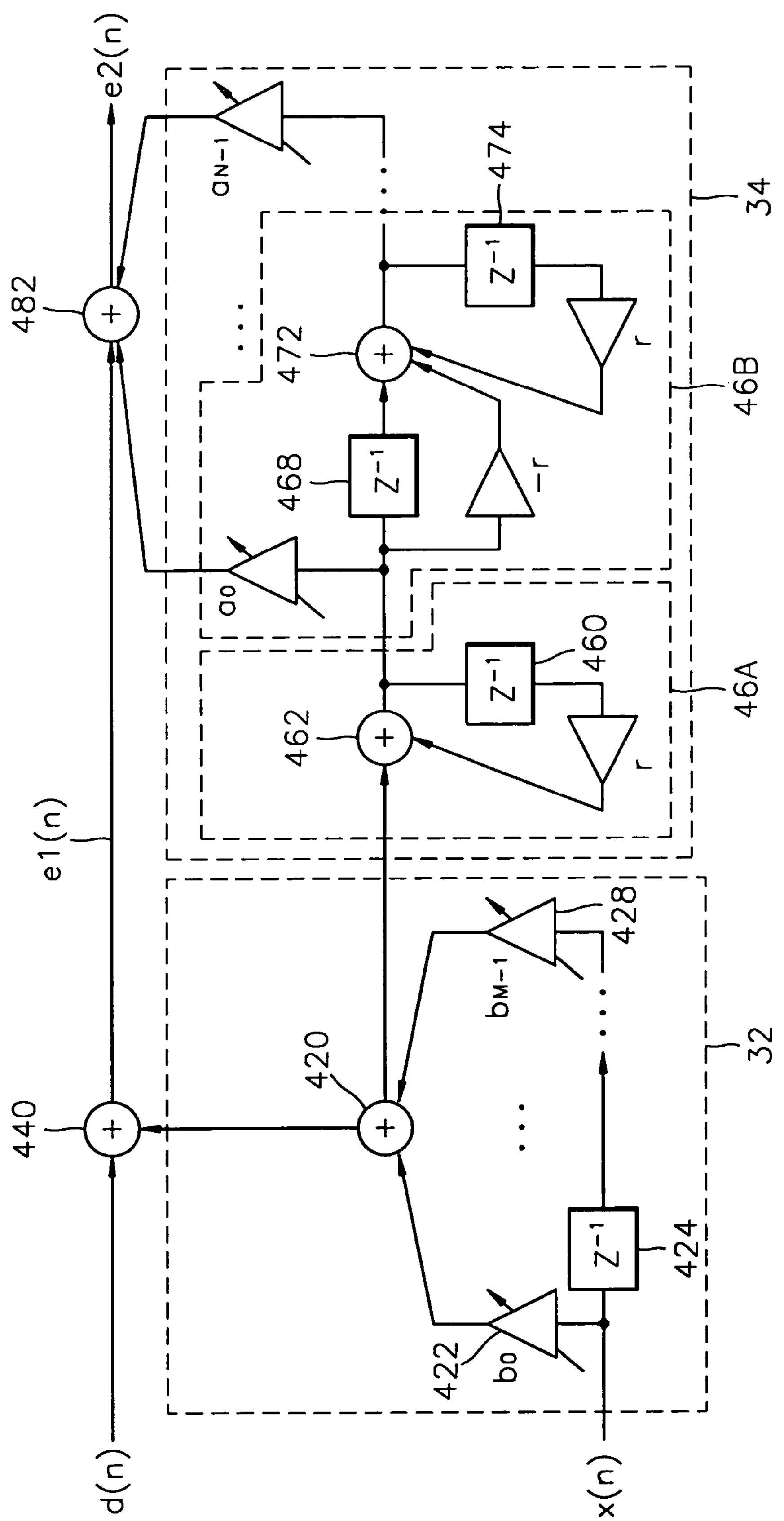
FIG. 4 is a schematic diagram illustrating the structure of the digital echo cancellation device of FIG. 3 in detail.

FIG. 4 shows the structure of the digital echo cancellation device of FIG. 3 in detail. Referring to FIG. 4, the adaptive beamformer 32 of the echo cancellation device according to the present invention includes a finite impulse response filter having M stages and an adder 420, where M is a predetermined positive number. A first stage includes a delay 424 and a coefficient $b_0$ 422. Each of the M stages, which have the same structure as that of the first stage, are serially connected. The orthogonalized IIR filter 34 includes a stage 46A comprising a delay 460 and an adder 462 for adding the signal output from the adder 420 of the adaptive beamformer 32 to a signal obtained by multiplying a signal output from the delay 460 with the coefficient r. Further, the IIR filter 34 includes a stage 46B comprising a delay 468 and an adder 472 for adding to each other the signal obtained by multiplying a signal output from the stage 46A with a coefficient −r, a signal which passes through the delay 468, and the signal obtained by multiplying a signal output from a delay 474 with the coefficient r. The IIR filter 34 comprises an additional N−1 stages having the same configuration as that of the stage 46B which are serially connected to each other for a total of N stages.

The operation of the above digital echo cancellation device will now be described. The receiving signal x(n) is multiplied with coefficients $b_0, \ldots, b_{M-1}$, while passing through M delays. The signals multiplied with the coefficients $b_0, \ldots, b_{M-1}$, while passing through the M delays, are input to the adder 420. The received transmission signal d(n) is adaptively estimated by the M stages of the adaptive beamformer 32. An adder 440 subtracts an estimated signal generated by the adaptive beamformer 32 from the receiving signal d(n) from which echo is to be canceled in order to generate the first error signal e1(*n*).

The adaptive beamformer 32 of the echo cancellation device according to the present invention estimates the front portion of an echo path impulse response with respect to a carrier serving area (CSA) loop. The front portion of the impulse response with respect to the CSA loop corresponds to a portion which rapidly changes in an impulse response characteristic curve. The signal estimated by passing through the adaptive beamformer 32 is provided to the orthogonalized IIR filter 34.

In the preferred embodiment, signals output from each of the N stages, where N is a predetermined positive number, are multiplied with coefficients $a_0, \ldots, a_{N-1}$ and the multiplication results are provided to an adder 482 which subtracts the first error signal e1(*n*) from the multiplication results to generate an echo-canceled second error signal e2(*n*).

The orthogonalized IIR filter 34 estimates a tail portion of the impulse response with respect to the CSA loop, that is, a tail portion of the echo path impulse response. The tail portion of the impulse response with respect to the CSA loop corresponds to a portion which is slowly reduced in the form of an exponent. The stability of the output of the IIR filter 34 is high since the signal estimated by passing through the adaptive beamformer 32 is used as an input and orthogonalized signals are used by the IIR filter 34.

According to the echo cancellation device of the present invention, it is possible to rapidly obtain the optimal resolution, to thus increase convergence speed since the well-estimated signal, which is output from the adaptive beamformer 32 is used as an input signal by the orthogonalized IIR filter 34. Also, since the convergence speed increases, the performance of the echo cancellation device is improved. Furthermore, the stability of the output of the filter is improved by using the orthogonalized IIR filter.

Also, according to the echo cancellation device of the present invention, the amount of calculation and the amount of memory are significantly reduced since the impulse response of the echo path is estimated by only several tens of taps.

The echo cancellation device according to the present invention can be applied to high speed bidirectional communications such as a very high bit-rate subscriber line (VDSL) and a giga byte Ethernet as well as an asymmetric digital subscriber's line (ADSL), and effectively cancels echo. Accordingly, it is possible to significantly improve the performance of a communication service.

As mentioned above, according to the digital echo cancellation device according to the present invention, the amount of calculation and the amount of memory are significantly reduced since the impulse response of the echo path is estimated by only the several tens of taps.

What is claimed is:

1. A digital echo cancellation device used for a high speed bidirectional communication system, comprising:

an adaptive beamformer comprising a finite impulse response filter for estimating an input receiving signal, the adaptive beamformer estimating a front portion of an echo path impulse response by adaptively estimating the input receiving signal; and an orthogonalized infinite impulse response (IIR) filter for receiving an estimated signal output from the adaptive beamformer and estimating a tail portion of the echo path impulse on the basis of an IIR.

2. The digital echo cancellation device of claim 1, further comprising:

a first adder for subtracting the estimated signal output from the adaptive beamformer from a receiving signal to generate a first error signal; and a second adder for receiving the first error signal and subtracting the signal output from the orthogonalized IIR filter from the first error signal to generate a second error signal in which echo is canceled.

3. A digital echo cancellation device used for a high speed bidirectional communication system, comprising:

an adaptive beamformer comprising a finite impulse response filter for estimating an input receiving signal, the adaptive beamformer estimating a front portion of an echo path impulse response by adaptively estimating the input receiving signal;

an orthogonalized infinite impulse response (IIR) filter for receiving an estimated signal output from the adaptive beamformer and estimating a tail portion of the echo path impulse response on the basis of an IIR;

a first adder for subtracting the estimated signal output from the adaptive beamformer from a received transmission signal to generate a first error signal; and a second adder for generating a second error signal from which echo is canceled by subtracting the signal output from the IIR filter from the first error signal.

4. The digital echo cancellation device of claim 3, wherein the orthogonalized IIR filter comprises:

a first stage comprising a first adder for receiving the estimated signal output from the adaptive beamformer and a first delay for delaying an output signal from the first adder, wherein the adder adds the estimated signal to a signal obtained by multiplying an output signal from the first delay with a coefficient r; and a plurality of additional stages which are serially connected to each other, wherein a first one of the additional stages is connected to an output signal from the first stage and comprises a second delay for delaying the output signal from the first stage, a third delay, and a second adder for adding a signal obtained by multiplying the output signal from the first stage with a coefficient −r, an output signal of the second delay, and a signal obtained by multiplying an output signal from the third delay with the coefficient r.

5. The digital echo cancellation device of claim 3, wherein output signals from each of the additional stages are multiplied by coefficients and then provided to the second adder to generate the second error signal.

* * * * *